Patented Dec. 16, 1952

2,622,006

UNITED STATES PATENT OFFICE 2,622,006

PROCESS FOR CHLORINATING TITANIFEROUS MATERIAL

Leif Aagaard, Plainfield, and Lancelot Watson Rowe, Fords, N. J., assignors to National Lead Company, New York, N. Y., a corporation of New Jersey No Drawing. Application April 5, 1951, Serial No. 219,512

5 Claims. (Cl. 23—87)

This invention relates to a method for chlorinating titaniferous materials. More specifically it relates to the chlorination of titanium materials containing magnesium and calcium compounds.

Many types of titaniferous materials have been chlorinated by prior processes. They include titaniferous ores, such as rutile ore, titaniferous iron ores such as ilmenite ore, and titanium slags and concentrates. These materials contain many constituents other than titanium; some of which do not affect the chlorination of the titanium values, while others when present prevent or hinder chlorination operation. Among the latter constituents are compounds of calcium and magnesium. These particular elements when present in the titanium material apparently block the reaction by forming calcium and magnesium chlorides which coat the particles and stop the chlorination reaction from proceeding in the normal manner.

An object of the present invention, therefore, is to provide a method for chlorinating titanium materials containing compounds of calcium and magnesium. Another object is to provide a method which is economical and easy to employ. A further object is to provide a process for chlorinating titanium material containing compounds of calcium and magnesium which will produce a substantially complete chlorination of the titanium values. These and other objects will become apparent from the following more complete description of the present invention.

In its broadest aspects this invention contemplates a process for chlorinating titaniferous material containing a compound selected from the group of metals consisting of calcium and magnesium. In the instant process the titaniferous material is mixed with a mineral acid selected from a group consisting of phosphoric acid and sulphuric acid. The mixture is heated at elevated temperature to form a dry mass, the dry mass is crushed and chlorinated at elevated temperature in the presence of a carbonaceous reducing agent to form titanium tetrachloride and a salt of said acid and said alkaline earth metal, whereby said titanium tetrachloride is separated from said salt by volatilization. By this process the calcium and magnesium values form salts with the mineral acid during the chlorination step instead of forming calcium and magnesium chlorides. By preventing the calcium and magnesium values from forming their respective chlorides no difficulties are encountered in selectively chlorinating the titanium values to form titanium tetrachloride.

The process of this invention is simple and easy to operate. The process comprises admixing the titaniferous material containing the calcium and magnesium values with a mineral acid, drying the resultant mass and chlorinating the dried mass by any known chlorination method. A preferred method for chlorinating the titanium material is to chlorinate said material in a "fluo-solids" operation in which the titanium values are suspended in the presence of carbon in a fluidized restraining bed. Chlorine gas is added up through the bottom of said bed to suspend and react with the titanium values. The finely divided dried mass is suspended in the gas stream and the titanium values are preferentially chlorinated to form titanium tetrachloride leaving the calcium and magnesium salts of the mineral acids behind in the bed. The presence of said salts of magnesium and calcium apparently do not hinder the chlorination of the titanium values and subsequently the chlorination of titanium proceeds in an unhampered manner.

Another method which employs titanium phosphate in chlorinating titaniferous materials is described and claimed in co-pending patent application Serial No. 219,511 filed April 5, 1951.

It has been found that the titanium values may be satisfactorily chlorinated if the amount of mineral acid added is equivalent to at least 50% of the amount required to react with all of the calcium and magnesium values. For best results however stoichiometric amounts are preferred.

It has been found that the titanium values may be preferentially chlorinated by employing a mineral acid which forms salts with the calcium and magnesium values. It is preferred to employ particularly phosphoric acid and sulphuric acid in order to repress the calcium and magnesium values from chlorinating. It is obvious that by the terms sulphuric acid and phosphoric acid it is intended to include anhydrous forms of such acids such as $P_2O_5$ and other such compositions. When employing sulphuric acid with compositions which contain large quantities of calcium and magnesium constituents, it is desirable although not essential to remove a major portion of the calcium and magnesium sulphates formed before chlorination. This separation may be easily accomplished by leaching the treated titanium material with water. The magnesium sulphate is soluble in water and the calcium sulphate formed may be separated from the titanium material by decantation.

In order to further illustrate a preferred embodiment of the present invention the following examples are presented:

Example 1

A titanium containing slag was used in this example. It had the following analysis:

| | Per cent |
|---|---|
| $TiO_2$ | 76.8 |
| FeO | 2.5 |
| MgO | 6.5 |
| CaO | 7.0 |
| Other oxides | 7.2 |

1000 parts of slag were mixed with 331 parts of 85% phosphoric acid. The amount of phosphoric acid used was equivalent to the theoretical amount necessary to react with all of the calcium and magnesium values present in the slag. The mixture was thoroughly agitated to form a uniform mass. The slurry was then boiled for 60 minutes in order to insure complete uniformity. The mass was dried and calcined at 700° C. for one hour in order to substantially completely dehydrate the entire mass. The mass was then ground to obtain a particle size ranging from 40 to 200 mesh. 1000 parts of this finely divided and dried mass were admixed with 250 parts of carbon. The mixture was then placed in a vertical tube furnace. 6.2 parts per minute of chlorine gas and 3.5 parts per minute of $CO_2$ were added to the bottom of said tube and allowed to pass up through the suspended mixture. The mixture was heated externally to a temperature of 850° C.

The velocity of the gases was sufficient to suspend the material thus forming a restraining bed of the mixture, and the reaction was continued for 3.5 hours. The temperature of chlorination was held between 800° C. and 850° C. 80% of the titanium values was converted to titanium tetrachloride with 91% utilization of the chlorine values. No sintering or sticking of the particles in the restraining bed occurred. The bed maintained its dynamic suspension throughout the entire run.

Example 2

1000 parts of the slag described in Example 1 were admixed with 293 parts of 96% sulphuric acid and the mass was dehydrated and ground according to the procedure described in Example 1.

The amount of sulphuric acid employed was equal to the amount required to theoretically react with all of the calcium and magnesium values present in the slag material. The finely divided dried mass was then chlorinated according to the procedure described in Example 1 and substantially identical results were obtained.

85% of the titanium values was converted to tetrachloride with 92% utilization of the chlorine. Again the bed maintained its dynamic suspension throughout the entire run and no sintering or sticking of the particles in the bed occurred.

In order to show the effectiveness of the process of this invention, that is chlorinating titanium values in the presence of a mineral acid, a control run was made by chlorinating a titanium material containing calcium and magnesium compounds without employing a mineral acid. The control run was carried out as follows:

The procedure described in Example 1 was used for this run. 400 parts of the same slag were admixed with 100 parts of carbon and placed in a vertical tube furnace. 6.2 parts per minute of chlorine gas and 3.5 parts per minute of $CO_2$ gas were added to the bottom of the tube and allowed to pass up through the suspended bed. The bed was heated to 850° C. and the gases were passed through the bed for two hours. At the end of two hours 22% of the titanium values had been converted to titanium tetrachloride with only 54% utilization of the chlorine. The suspended bed formed a sticky and gummy mass in the tube furnace and apparently the calcium and magnesium values were chlorinated and the chlorides of calcium and magnesium formed a coating over the titanium values which prevented further chlorination of the titanium.

By comparing the results of the examples with that of the control run it has clearly been shown that titaniferous material containing calcium and magnesium values may be chlorinated efficiently and directly by the process of this invention. Apparently the presence of a mineral acid during the chlorination of the titanium material reacts with the calcium and magnesium values to form calcium and magnesium salts of the mineral acids which are not chlorinated during the chlorination of the titanium values. The titanium values are therefore preferentially chlorinated. High yields of titanium tetrachloride may be obtained directly without processing difficulties.

While this invention has been described and illustrated by the examples shown it is not intended to be strictly limited thereto and other modifications and variations may be employed within the scope of the following claims:

We claim:

1. Method for chlorinating a titaniferous material containing a compound of a metal selected from the group consisting of calcium, and magnesium which comprises admixing said titaniferous material and an acid selected from the group consisting of phosphoric acid and sulphuric acid in amount up to substantially the stoichiometric amount to form salts of said metal and thereby to form mixture substantially free from titanium salts of said acids, heating the mixture to form a dry mass, crushing said dry mixture and chlorinating said mixture at elevated temperature in the presence of a carbonaceous reducing agent to form titanium tetrachloride and a salt of said acid and said metal, whereby said titanium tetrachloride is separated from said salt by volatilization.

2. Method according to claim 1 in which said titaniferous material contains a calcium compound.

3. Method according to claim 1 in which said titaniferous material contains a magnesium compound.

4. Method according to claim 1 in which the mineral acid employed is phosphoric acid.

5. Method according to claim 1 in which the mineral acid is sulphuric acid.

LEIF AAGAARD.
LANCELOT WATSON ROWE.

REFERENCES CITED

The following references are of record in the file of this patent:

UNITED STATES PATENTS

| Number | Name | Date |
|---|---|---|
| 2,154,130 | Kingsbury et al. | Apr. 11, 1939 |